US008886720B2

(12) United States Patent
Serr et al.

(10) Patent No.: US 8,886,720 B2
(45) Date of Patent: Nov. 11, 2014

(54) MANAGING UNIFIED COMMUNICATIONS CONFERENCES VIA CATEGORIES

(75) Inventors: Robert Serr, Redmond, WA (US); Scott Huddleston, Redmond, WA (US); Jason Bubolz, Redond, WA (US); Mark McClelland, Redmond, WA (US); Mark Madsen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1190 days.

(21) Appl. No.: 12/143,853

(22) Filed: Jun. 23, 2008

(65) Prior Publication Data

US 2009/0319913 A1 Dec. 24, 2009

(51) Int. Cl.
*G06F 15/16* (2006.01)
*H04M 3/56* (2006.01)
*H04L 12/18* (2006.01)

(52) U.S. Cl.
CPC ...... *H04M 3/567* (2013.01); *H04M 2203/5063* (2013.01); *H04L 12/1818* (2013.01)
USPC ........................................................ 709/204

(58) Field of Classification Search
USPC ........................................................ 709/204
See application file for complete search history.

(56) References Cited

U.S. PATENT DOCUMENTS

| 5,471,318 | A | * | 11/1995 | Ahuja et al. | 358/400 |
| 5,909,543 | A | * | 6/1999 | Tanaka et al. | 709/204 |
| 6,047,288 | A | * | 4/2000 | Kurosawa et al. | 1/1 |
| 6,625,652 | B1 | | 9/2003 | Miller et al. | |
| 6,704,769 | B1 | | 3/2004 | Comstock et al. | |
| 6,807,563 | B1 | * | 10/2004 | Christofferson et al. | 709/204 |
| 6,865,538 | B2 | * | 3/2005 | Chithambaram et al. | 705/1.1 |
| 7,299,193 | B2 | * | 11/2007 | Cragun et al. | 705/7.13 |
| 7,480,674 | B2 | * | 1/2009 | Venguerov | 1/1 |
| 7,679,518 | B1 | * | 3/2010 | Pabla et al. | 340/573.1 |
| 7,702,730 | B2 | * | 4/2010 | Spataro et al. | 709/205 |
| 7,912,901 | B2 | * | 3/2011 | Chakra et al. | 709/204 |
| 7,984,378 | B1 | * | 7/2011 | Atkins et al. | 715/733 |
| 8,526,587 | B2 | * | 9/2013 | Uhler et al. | 379/202.01 |
| 2002/0034164 | A1 | * | 3/2002 | Sjoholm et al. | 370/260 |
| 2003/0046344 | A1 | * | 3/2003 | Kumhyr et al. | 709/205 |
| 2003/0149605 | A1 | * | 8/2003 | Cragun et al. | 705/8 |
| 2004/0039579 | A1 | * | 2/2004 | Chithambaram et al. | 705/1 |
| 2004/0047461 | A1 | * | 3/2004 | Weisman et al. | 379/202.01 |
| 2004/0111478 | A1 | * | 6/2004 | Gross et al. | 709/206 |
| 2004/0114541 | A1 | | 6/2004 | Caspi et al. | |

(Continued)

OTHER PUBLICATIONS

"FlashPioneer Web Conferencing Chat 1.7 Build 80108", (retrieved on Apr. 21, 2008) http://www.redsofts.com/soft/214/76037/FlashPioneer_Web_Conferencing_Chat.html.

(Continued)

*Primary Examiner* — Tauqir Hussain
(74) *Attorney, Agent, or Firm* — Andrew Smith; Jim Ross; Micky Minhas

(57) ABSTRACT

A conference management system is described for administering large numbers of conferences in an organization. The conference management system receives a hierarchical set of categories from a system administrator and configuration settings for each category. When a user requests to create a new conference, the conference management system creates the conference and assigns the new conference to a category. The conference takes on the settings of the category to which it belongs, which eliminates individual configuration of each conference. Administrators can also delegate authority to manage conferences to others in the organization.

20 Claims, 5 Drawing Sheets

(56) References Cited

U.S. PATENT DOCUMENTS

| | | |
|---|---|---|
| 2005/0027802 A1 | 2/2005 | Madsen et al. |
| 2005/0193129 A1* | 9/2005 | Barlow ........................ 709/204 |
| 2006/0004921 A1* | 1/2006 | Suess et al. .................. 709/227 |
| 2006/0092269 A1* | 5/2006 | Baird et al. ................ 348/14.08 |
| 2006/0161579 A1* | 7/2006 | Venguerov ................... 707/102 |
| 2007/0112926 A1* | 5/2007 | Brett et al. ................... 709/206 |
| 2007/0124373 A1* | 5/2007 | Chatterjee et al. ............ 709/204 |
| 2008/0052357 A1* | 2/2008 | Branson et al. ............... 709/205 |
| 2008/0072159 A1* | 3/2008 | Cockerton ................... 715/756 |
| 2008/0091785 A1* | 4/2008 | Pulfer et al. ................. 709/206 |
| 2008/0181140 A1* | 7/2008 | Bangor et al. ............... 370/261 |
| 2008/0235362 A1* | 9/2008 | Kjesbu et al. ................ 709/223 |
| 2009/0083105 A1* | 3/2009 | Bhogal et al. .................... 705/8 |
| 2009/0111425 A1* | 4/2009 | Forbes et al. ................. 455/411 |
| 2009/0204678 A1* | 8/2009 | Shah ............................. 709/206 |
| 2009/0210494 A1* | 8/2009 | Fisher et al. .................. 709/205 |
| 2010/0017371 A1* | 1/2010 | Whalin et al. .................... 707/3 |
| 2010/0042704 A1* | 2/2010 | Chakra et al. ................ 709/221 |
| 2010/0248755 A1* | 9/2010 | Vance et al. .................. 455/466 |
| 2011/0154192 A1* | 6/2011 | Yang et al. .................... 715/256 |
| 2012/0230485 A1* | 9/2012 | Yap et al. ................. 379/202.01 |
| 2013/0212494 A1* | 8/2013 | Heiferman et al. ........... 715/753 |
| 2013/0219298 A9* | 8/2013 | Whalin et al. ................ 715/753 |

OTHER PUBLICATIONS

"Collaborative Discourse Structures in Computer Mediated Group Communications", (retrieved on Apr. 21, 2008) http://jcmc.indiana.edu/vol4/issue4/turoff.html.

Pimplapure, Ashish, "Virtual Groups: A Web Based Electronic Conferencing System for Online Education", Date: Aug. 1996, 77 Pages.

Tham, et al., "A Distributed Peer-to-Peer Platform for Synchronized Group Collaboration and Knowledge Sharing", 2004 International Symposium on Distributed Computing and Applications to Business, Engineering and Science (DCABES), Wuhan, Hubei, China, Sep. 12-16, 2004, 6 Pages.

* cited by examiner

MANAGING UNIFIED COMMUNICATIONS CONFERENCES VIA CATEGORIES

BACKGROUND

Unified communications (UC) is a commonly used term for the integration of disparate communications systems, media, devices, and applications. UC potentially includes the integration of fixed and mobile voice, e-mail, instant messaging, desktop and advanced business applications, Internet Protocol (IP)-PBX, voice over IP (VoIP), presence, voicemail, fax, audio/video/web conferencing, unified messaging, unified voicemail, whiteboarding (i.e., application sharing), and other modes of communication (or modalities) into a single environment offering the user a more complete but simpler and more effective experience. The purpose of UC is to reduce human latency in business processes, which is defined as the time it takes to initiate appropriate steps after being alerted to a particular issue. One reason behind human latency is the need to consult with colleagues to get further information.

UC helps with both of these areas by providing multiple modalities of communication and rich information within the communication. UC integrates various communication systems that a user might already be using and helps those systems work together in real time. For example, UC technology could allow a user to seamlessly collaborate with another person on a project, even if the two users are in separate locations. The user could quickly locate the desired person by accessing an interactive directory, engage in a text messaging session, and then escalate the session to a voice call or even a video call—all within minutes. In another example, an employee receives a call from a customer who wants answers. UC can enable the employee to access a real-time list of available expert colleagues, then make a call that would reach the desired person. This enables the employee to answer the customer faster and eliminate rounds of back-and-forth emails and phone-tag.

Each of the modalities of UC can be extended to a group or many-to-many conversation in addition to one-to-one communication. In the group case, the modes become conferences. Conferences may be scheduled in advance or they may be scheduled ad hoc. In either case, conferences have attributes that the participants use to manage and describe them. Many attributes are shared across conference types. For example, all conferences typically have a membership list denoting people who can join the conference. Additionally conferences may specify whether a system will log the conference (e.g., record it to a file) and whether participants are allowed to upload files and other attachments during the conference.

In organizations, conferences are typically created based on topics, where the topics map to the workflow of the business. Large organizations have many workflows and therefore use many conferences to facilitate communication among teams and other groups of participants. An administrator typically manages the conference, setting attributes such as those described above, and enforcing other restrictions upon the conference, such as who can create a conference, who can attend, and so forth. As the number of conferences grows to be very large, the system becomes difficult to administer. As the number of conferences grows, the administrator becomes overwhelmed and the organization may hire many administrators or hold fewer conferences than would be useful.

SUMMARY

A conference management system is described for administering large numbers of conferences in an organization. The conference management system receives a hierarchical set of categories from a system administrator. The conference management system receives configuration settings for each category, and categories may inherit the configuration settings of ancestor/parent categories. When a user requests to create a new conference, the conference management system creates the conference and assigns the new conference to a category. The conference, by default, takes on the settings of the category to which it belongs (and any inherited settings from ancestor categories). Thus, by creating categories the administrator can eliminate the need to individually configure each conference.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A conference management system is described for administering large numbers of conferences in an organization. The conference management system receives a hierarchical set of categories from a system administrator. For example, the administrator may create categories based on the taxonomy of an organization, such as a corporation. The categories may include conferences for each department or team within the company or any other organizational structure desired by the organization. The conference management system receives configuration settings for each category, and categories may inherit the configuration settings of ancestor/parent categories. For example, the administrator may configure categories for a sales department and a marketing department of a company, and each category may have different default settings, such as the list of participants that can attend conferences that belong to the category. When a user requests to create a new conference, the conference management system creates the conference and assigns the new conference to a category. The conference, by default, takes on the settings of the category to which it belongs (and any inherited settings from ancestor categories). Thus, by creating categories the administrator can eliminate the need to individually configure each conference.

The work performed by a conference administrator in prior conference administration systems is often repetitive because many conferences share similar attributes and some conferences recur on a routine basis (e.g., a weekly status meeting). In addition, there are often aspects of administering the conference that can be delegated to users, such as a conference leader or other participants. The conference management system organizes conferences into categories and assigns attributes to conferences at the category level. In addition, the conference management system allows an administrator to delegate rights to manage particular conference categories to end-users of the system, such as conference participants or managers within an organization.

For example, a large investment bank often has an Equities group and there may be a text conference, or chat room, to discuss each of the equities sectors as well as the top equities covered by the group. This may result in hundreds or even thousands of conferences, but as the conferences all fall under the same group it is likely that they will all be managed similarly. So, rather than creating 1,000 individual conferences, or in this case chat rooms, and managing them on an individual basis, it is much more efficient to manage an "Equities" category where all 1,000 conferences contained in the Equities category automatically inherit the settings placed on the Equities category.

Figure 1:
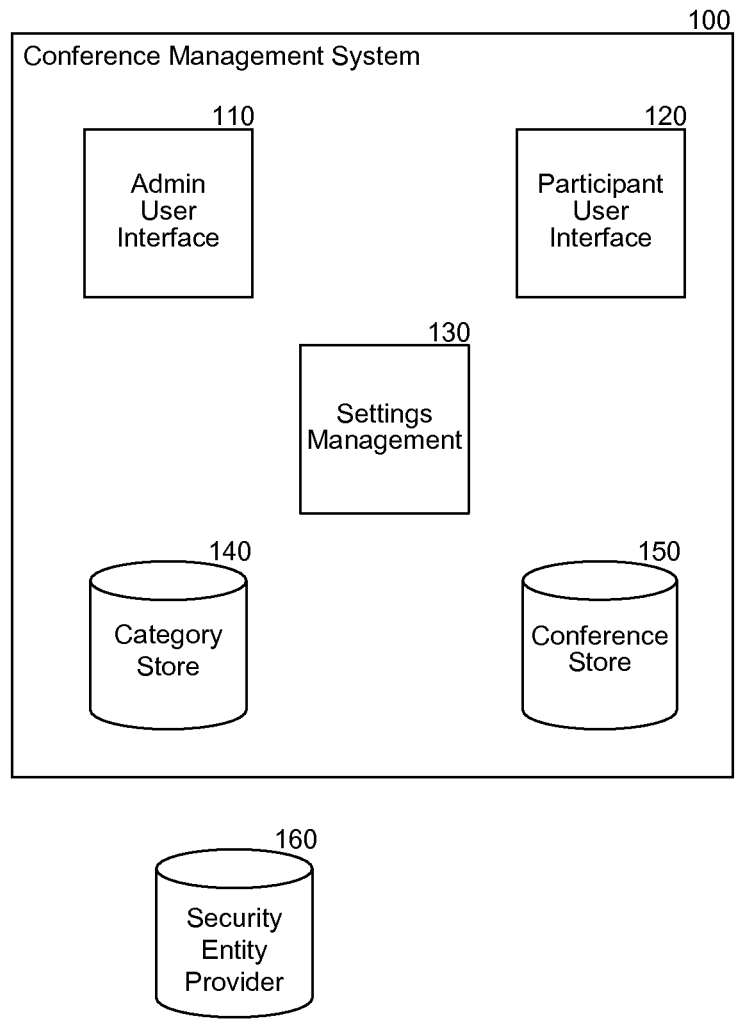
FIG. 1 is a block diagram that illustrates components of a conference management system, in one embodiment.

FIG. 1 is a block diagram that illustrates components of the conference management system, in one embodiment. The conference management system 100 includes an administrative user interface component 110, a participant user interface component 120, a settings management component 130, a category store 140, and a conference store 150. The conference management system 100 may also interact with an external security entity provider 160, described further herein. Each of these components is described in further detail herein.

The administrative user interface component 110 provides an interface through which an administrator can create categories, manage configuration settings associated with each category, manage the assignment of conferences to categories, and so forth. For example, the administrator may use the administrative user interface component 110 to create an initial high-level set of categories and configure users in an organization that have authority to add additional categories as children of the high-level set of categories. In this way, the administrator sets up a paradigm for organizing conferences in an organization and delegates the work of configuring more specific conference needs for each part of the organization to other users.

The participant user interface component 120 provides a user interface for non-administrators to interact with the conference management system 100. For example, participants in a conference may be able to view the settings that apply to a conference, such as the list of participants, even though they might not have the authority to modify all of the settings provided by the administrative user interface component 110.

The settings management component 130 manages conferences and categories and determines the settings to apply to each. For example, if a category is a child of another category, the settings management component 130 is responsible for inheriting settings from the patent to the child category. As another example, if the child category has overridden certain settings of the parent category, then the settings management component 130 manages the overridden settings. The settings management component 130 also manages the roles of various users within the system 100, such as which users can manage each category.

The category store 140 stores the categories and the relationships between them. The conference management system 100 may store conference categories in a database, file, or other suitable storage. The system may use an existing store, such as a corporate directory, corporate database, a database related to other communication services, and so on.

The conference store 150 stores the conferences management by the conference management system 100. The conference store 150 stores information about the category to which each conference belongs, and any specific settings applied to the conference that override the category settings. For example, a particular meeting may be assigned to a category that is appropriate for most settings, but the meeting may include a one-time guest that is added to the participant list.

The security entity provider component 160 provides users and groups of users that can be assigned to various conference and category settings. For example, the settings associated with a conference or category may include a participant list that can include users and groups from a corporate directory. Administrators often invest substantial time in creating and maintaining a corporate directory, and leveraging that directory in the conference management system 100 allows administrators to save time and reduce errors introduced by managing separate groups of users. For example, if the corporate directory and the conference management system 100 contained separate lists of employees in a department, it is possible that an administrator would forget to remove an employee from one of the lists when an employee left the company or changed departments. By leveraging the existing corporate directory or other security entity provider component 160, the conference management system 100 stays up to date with the latest organizational changes The computing devices on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

In some embodiments, the conference management system creates hierarchical conference categories. An administrator or other designated user can modify conference attributes at any category level and those attributes will be inherited by conferences at a lower level in the hierarchy. The hierarchical system starts with a root category, and conferences and other conference categories exist under the root category. New categories can be created underneath the root level and categories can contain additional categories. Categories at any level may contain conferences, where conferences represent text conferences (Chat Rooms), Audio\Video Conferences, or Data Conferences (Live Meetings).

Categories and conferences both represent nodes, and they are managed similarly. Therefore, most attributes that exist on conferences also exist on categories. Attributes managed at the category level are by default inherited by conferences that are contained within the category; however, nodes may override the settings of their parent and thus break the inheritance chain. Category and conference attributes may include attributes such as membership lists, manager lists, voice lists (who can contribute to the conference), file post permissions, whether the conference is recorded, modalities, and so forth.

Figure 2:
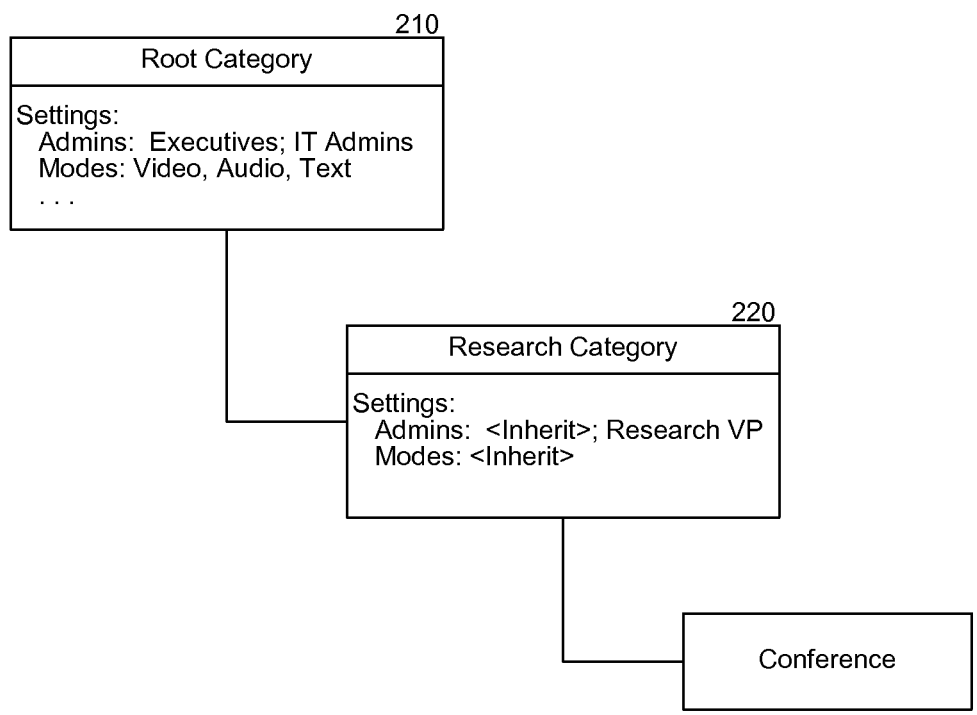
FIG. 2 is a tree diagram that illustrates a hierarchy of categories, in one embodiment.

FIG. 2 is a tree diagram that illustrates a hierarchy of categories, in one embodiment. A company has a root category 210, and an administrator or group of administrators is assigned the rights to manage conferences below the root category 210. A research category 220 represents conferences within the research group of the company. The conference categorization system assigns an administrator or group of administrators to the research category 220. An administrator of the research category 220 may have fewer rights than an administrator of the root category 210. For example, the administrator of the research category may not have sufficient access to modify elements of the tree outside of the research category 220.

Figure 3:
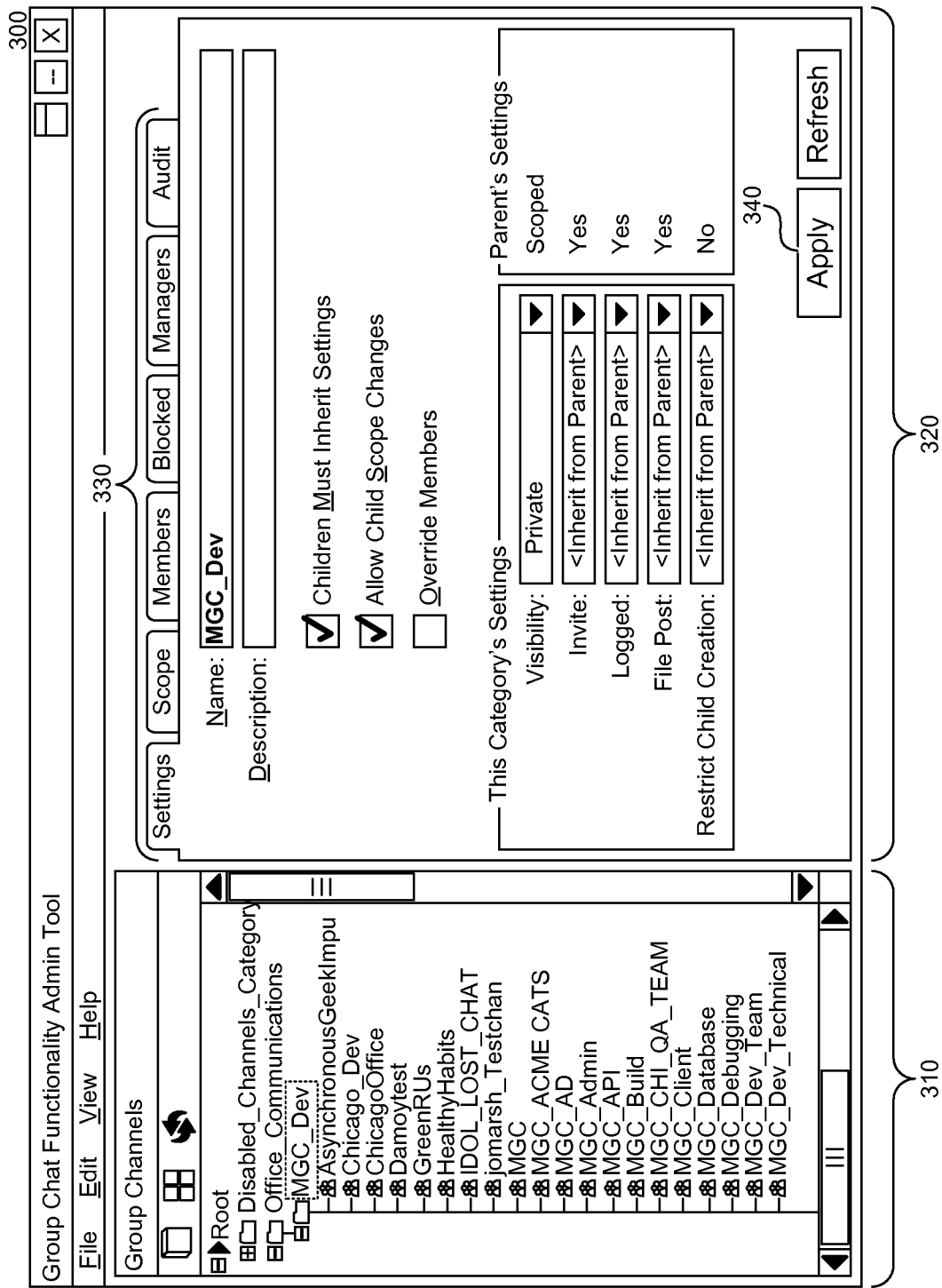
FIG. 3 is a display diagram that illustrates an administrative user interface of the conference management system, in one embodiment.

FIG. 3 is a display diagram that illustrates the administrative user interface of the conference management system, in one embodiment. The user interface 300 contains a hierarchical tree view 310 of categories, a settings area 320, and one or more settings sections 330, and an apply button 340. The tree view 310 displays the categories defined by an administrator, such as through the user interface 300. As shown, the MGC_Dev category is contained in an Office_Communications category, which is contained in a Root category. The MGC_Dev category has attributes such as Name, Visibility, Invite, Logged, File Post, Restrict Child Creation, Scope, Members, Blocked, and Managed. Any settings made at this category level will affect any conferences (e.g., chat rooms) contained within that category. The settings area 320 displays the settings for the current selected category. Settings can include the users within the organization that can manage the conference, the users that can participate in the conference, whether files can be uploaded to the conference, how settings are inherited between categories, and so forth. The settings sections 330, such as the tabs shown, provide a mechanism for organizing category settings to help the user handle larger amounts of information. When the administrator has completed making changes for a category, activating the apply button 340 directs the conference management system to save the administrator's configuration changes.

An example use of the conference categorization system is recurring meetings. A recurring meeting typically involves the same attendees and the same requirements. For example, a team of engineers may have a weekly status meeting that uses videoconferencing. Rather than setup the meeting and conference settings each week, the meeting organizer can create a conference category for the meeting and associate the meeting with the category. The meeting uses the member list and other information from the conference for the meeting each week without administrator intervention.

Figure 4:
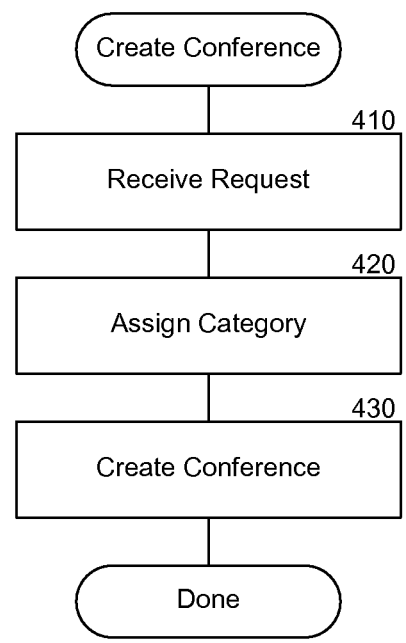
FIG. 4 is a flow diagram that illustrates processing of a settings management component when a request is received to create a conference, in one embodiment.

FIG. 4 is a flow diagram that illustrates the processing of the settings management component when a request is received to create a conference, in one embodiment. These steps typically occur after an administrator has created one or more conference categories, when a user creates a conference. In block 410, the component receives a request to create a conference. For example, a user may invoke a user interface for creating conferences provided by the system. In block 420, the component assigns a category to the conference. The component may assign the category automatically, such as based on the user that made the request and administrative settings made by a conference administrator that only allow the user to create conferences in a particular category. Alternatively, the user may suggest a category for which the user has authority to create conferences. In block 430, the component creates the conference and stores it in the conference store with information about the assigned category. The user may be able to modify some settings of the conference and not others based on the configuration settings of the category and ancestor categories from which the conference inherits settings. For example, the user may be allowed to add new participants, but not enable a mode of communication (e.g., video) for the conference that was denied by an administrator of the category.

In some embodiments, users of the conference management system can create new conferences based on a previous conference. For example, the system may present a user interface for selecting a previous conference having a category like the one the user currently wants to create. The previous conference may have the same participant list and other settings that the user wants for the current conference. For example, the user may hold a weekly conference call that has the same participant list and dial-in telephone number each week. By selecting a previous conference, the new conference copies the previous conference's category and any overridden settings specified by the conference. The user may also select a particular conference category directly to create a conference having the settings of that category (and inherited from the parent categories).

In some embodiments, the conference management system provides an administrative tool for users to add new conferences. For example, the system may provide a web page or other user interface through which users can specify the attributes of new conferences or select existing conference categories. Initially, an administrator may use the administrative tool to create conference categories based on a taxonomy of the organization. For example, the administrator may create a conference category for each department within the organization, such as sales, research, marketing, and so forth. The administrator may also assign users to each category that will have the authority to administer aspects of conferences within each category. For example, the administrator may assign the Vice President of Research to the research category, the Chief Marketing Officer to the marketing category, and so forth. Each user may then create additional categories related to his/her department and assign users within the department that can administer each category.

Figure 5:
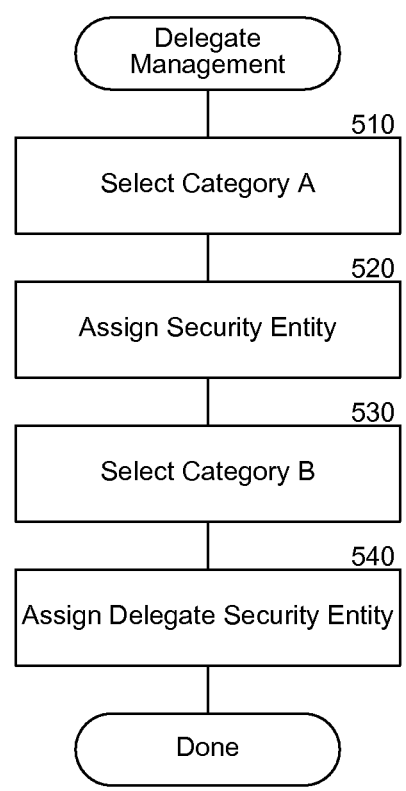
FIG. 5 is a flow diagram that illustrates processing of the settings management component when an administrator delegates conference management authority, in one embodiment.

FIG. 5 is a flow diagram that illustrates the processing of the settings management component when an administrator delegates conference management authority, in one embodiment. In block 510, the component receives a selection of a category. For example, the administrator may interact with the system through the administrative user interface to find and select a particular category that the administrator wants to manage. In block 520, the component assigns a security entity to the selected category. For example, the administrator may specify that executives of a company have the authority to administer conferences in the selected category. Later, one of the executives or another administrator may further delegate authority to another user or group of users. In block 530, the component receives a selection of a category that is a child of the original selected category. For example, a root category may have a child category assigned to conferences for a Research Department of a company. In block 540, the component assigns a delegate security entity to the child category. For example, the executive or other administrator may select a Research Department Vice President as a person with authority to manage conferences within the Research Department. In this way, authority can be delegated to manage conferences throughout an organization, and an administrator that previously would manage all conferences within an organization can be freed to do other work.

In some embodiments, the conference management system integrates with a separate corporate directory to manage users and user permissions related to conferences. For example, Microsoft Windows provides Active Directory, which is an implementation of lightweight directory access protocol (LDAP) directory services. The main purpose of Active Directory is to provide central authentication and authorization services for Windows-based computers. Active Directory also allows administrators to assign policies, deploy software, and apply updates to computers within an organization. Active Directory stores information and settings in a central database accessible by all computers in a corporate network.

There are several types of groups of users provided by Active Directory and other corporate directories, including distribution lists, security groups, and organizational units. Distribution lists are typically used to send email to a group of users, such as all developers in an organization. Security groups are typically used to secure resources such as network shares, directories, and files, based on membership of users within a group. Organization units are used in directories to place each user in one place within an organization (e.g., by department, such as sales, or building, such as building 42, and so forth). Each of these groups allow an administrator to assign permissions and rights to the group, and not have to modify the permissions of various resources each time a user joins or leaves the organization, or changes departments within the organization. Instead, an administrator can simply add or remove a user from the appropriate groups, and the user will have the same ability to access resources as other members in the group.

By leveraging existing groups, the conference management system gains similar administrative advantages. For example, the participant list of a conference can be specified as a group, and as the membership of the group changes, the participant list of the conference will be up to date. Groups can also be specified at the category level. For example, a particular group can be the default entry in the participant list for each conference created within a category, or a particular group can be given permission by an administrator to manage conferences within the category. Using groups allows the organization to leverage the existing investment in the corporate directory.

In some embodiments, the conference management system stores conferences after they have taken place for future references. For example, the system may store an audio file, transcript, files uploaded during the conference, a video of the conference, and so forth. Conference participants can return to the conference later to review what was said by the other participants or review the materials presented. In addition, if the conference participants include one or more groups, new members of the group may be permitted to view the conference. For example, a team may produce a conference that introduces new members to the team. This conference may initially be a live conference, but the system may archive it for future members of the team to view to gain the benefit of the information presented at the conference.

In some embodiments, the conference management system automatically creates categories. For example, the system may examine conferences within an organization and find a common pattern, such as a similar list of participants, similar modes of communication, and so forth. In such cases, the system may offer to automatically create categories for the conferences to simplify the administrative burden of managing many individual conferences. The system may also suggest sub-categories within existing categories. For example, if the system determines that a set of conferences are overriding a default setting inherited from a parent category, the system may create a category for the set of conferences that overrides the setting and allows administration of the category instead of each conference within the set.

In some embodiments, the conference management system differentiates the right to configure a conference or category from the right to participate in the conference or category. For example, although a person in upper management may have administrative privileges to a high-level conference category for his/her department, the person may not be invited to every conference and may not want to receive a flood of invites for every conference created within the department. Nevertheless, the person may still access any conference within the categories for which he/she has the right to configure and modify the configuration of the conference. Managers of categories lower in the hierarchy may add additional managers, but not remove managers set at a higher category level. This prevents orphaning categories or cutting someone with higher privileges out of the list of those that can configure the category.

In some embodiments, the conference management system allows categories to be moved within the hierarchy of categories. For example, an administrator may move a category for a particular department of an organization to another category associated with a different part of the organization. Because of the attributes inherited by a category based on its placement within the hierarchy, such a move may change the settings associated with conferences in the category. Thus, the conference management system may ask the user whether the settings associated with the new parent are to be inherited by the category, or whether settings of the old parent are to be copied to the category so that the settings survive the move.

Although several types of settings that can be associated with a category or conference are described herein as examples, those of ordinary skill in the art will recognize that numerous possible settings exist that can be handled by the conference management system using categories in the manner described. Some examples include the member list, manager list, voice list, allowed modalities, file upload, and log creation, but many other types of settings can be managed by the system.

In some embodiments, the conference management system differentiates between passive and active participants in a conference. Passive participants can receive conference information, such as listening to audio, watching video, and downloading files. Active participants can do the same things as passive participants, but can also speak and contribute information, such as files, to the conference. The conference management system stores both types of participants in a participant or member list, and tracks active participants in a separate list called a voice list. The system may distinguish participants in the conference using additional lists, such as a list of participants that are allowed to manage or configure the conference. When a user is removed from the participant list, the system may also remove the user from other lists, such as the voice list, to prevent the unusual situation of a user having rights to speak in a conference but not join the conference.

In some embodiments, the conference management system stores a list of blocked users that may not participate in the conference. For example, a user may find a convenient security group within the organization that contains all of the participants that the user wants to invite to a conference in addition to a few extra users that the user does not want to invite to the conference. The user can add the security group to the member list, and add the extra users to the blocked list to achieve a conference with the desired participants. The system subtracts members of the blocked list from those in the member list to create the actual list of participants.

From the foregoing, it will be appreciated that specific embodiments of the conference management system have been described herein for purposes of illustration, but that various modifications may be made without deviating from the spirit and scope of the invention. For example, although certain types of conferences and settings are described herein, the conference management system can be applied to many types of conferences (e.g., video, audio, application sharing, text-based, and so on) and many settings within those conferences (e.g., participant list, codecs, file types, and so forth) to help administrators and other users within an organization manage conferences. Accordingly, the invention is not limited except as by the appended claims.

We claim:

1. A method performed on a computing device, the method comprising:
   receiving, by the computing device, a request to create a conference;
   creating the requested conference; and
   assigning the created conference to a category at a level of a hierarchy of categories, where the hierarchy is configured for at least one conference to be assigned to levels of the hierarchy, where the assigned conference inherits conference attributes from the hierarchy based on the level of the assigned category, where the created conference is configured for overriding at least one of the inherited conference attributes, and where at least one of the inherited conference attributes enables a participant in the created conference to manage an aspect of the created conference.

2. The method of claim 1 where each category in the hierarchy is configured for inheriting conference attributes from its parent category.

3. The method of claim 1 where the conference attributes include at least a list of participants of the created conference.

4. The method of claim 1 where the conference attributes differentiate active participants of the created conference from passive participants of the created conference.

5. The method of claim 1 where the conference attributes differentiate one or more users authorized to participate in the created conference from one or more users authorized to administer the created conference.

6. The method of claim 1 where the requested conference is specified to be a text conference, an audio/video conference, or a data conference.

7. The method of claim 1 where the conference attributes indicate recording of a conference.

8. A system comprising a computing device and at least one program module that are together configured for performing actions comprising:
   receiving, by the computing device, a request to create a conference;
   creating the requested conference; and
   assigning the created conference to a category at a level of a hierarchy of categories, where the hierarchy is configured for at least one conference to be assigned to levels of the hierarchy, where the assigned conference inherits conference attributes from the hierarchy based on the level of the assigned category, where the created conference is configured for overriding at least one of the inherited conference attributes, and where at least one of the inherited conference attributes enables a participant in the created conference to manage an aspect of the created conference.

9. The system of claim 8 where each category in the hierarchy is configured for inheriting conference attributes from its parent category.

10. The system of claim 8 where the conference attributes include at least a list of participants of the created conference.

11. The system of claim 8 where the conference attributes differentiate active participants of the created conference from passive participants of the created conference.

12. The system of claim 8 where the conference attributes differentiate one or more users authorized to participate in the created conference from one or more users authorized to administer the created conference.

13. The system of claim 8 where the requested conference is specified to be a text conference, an audio/video conference, or a data conference.

14. The system of claim 8 where the conference attributes indicate recording of a conference.

15. At least one computer-readable memory device storing computer-executable instructions that, when executed by a computing device, cause the computing device to perform actions comprising:
   receiving, by the computing device, a request to create a conference;
   creating the requested conference; and
   assigning the created conference to a category at a level of a hierarchy of categories, where the hierarchy is configured for at least one conference to be assigned to levels of the hierarchy, where the assigned conference inherits conference attributes from the hierarchy based on the level of the assigned category, where the created conference is configured for overriding at least one of the inherited conference attributes, and where at least one of the inherited conference attributes enables a participant in the created conference to manage an aspect of the created conference.

16. The at least one computer-readable memory device of claim 15 where each category in the hierarchy is configured for inheriting conference attributes from its parent category.

17. The at least one computer-readable memory device of claim 15 where the conference attributes include at least a list of participants of the created conference.

18. The at least one computer-readable memory device of claim 15 where the conference attributes differentiate active participants of the created conference from passive participants of the created conference.

19. The at least one computer-readable memory device of claim 15 where the conference attributes differentiate one or more users authorized to participate in the created conference from one or more users authorized to administer the created conference.

20. The at least one computer-readable memory device of claim 15 where the requested conference is specified to be a text conference, an audio/video conference, or a data conference.

* * * * *